: (12) United States Patent
Sriskanthan et al.

(10) Patent No.: US 7,849,239 B2
(45) Date of Patent: Dec. 7, 2010

(54) INTERFACE DEVICE

(75) Inventors: Nadarajah Sriskanthan, No. 33 Nanyang View, Singapore (SG) 639635; Woan Shu Hung, Singapore (SG); Zheng Lei, Singapore (SG); Tan Su Lim, Singapore (SG)

(73) Assignee: Nadarajah Sriskanthan, Singapore (SG)

( * ) Notice: Subject to any disclaimer, the term of this patent is extended or adjusted under 35 U.S.C. 154(b) by 474 days.

(21) Appl. No.: 10/586,423

(22) PCT Filed: Jan. 18, 2005

(86) PCT No.: PCT/SG2005/000011

§ 371 (c)(1),
(2), (4) Date: Apr. 18, 2008

(87) PCT Pub. No.: WO2005/067409

PCT Pub. Date: Jul. 28, 2005

(65) Prior Publication Data

US 2008/0209091 A1 Aug. 28, 2008

(30) Foreign Application Priority Data

Jan. 19, 2004 (SG) .............................. 200400208-5

(51) Int. Cl.
*G06F 13/12* (2006.01)

(52) U.S. Cl. ............................. 710/64; 710/11; 710/105

(58) Field of Classification Search ...................... 710/8, 710/11, 35, 52, 62, 64, 5, 105, 110, 305, 710/306; 725/109, 110, 139, 140
See application file for complete search history.

(56) References Cited

U.S. PATENT DOCUMENTS

| 5,894,328 | A | * | 4/1999 | Tahara et al. | ........... | 375/240.25 |
| 6,008,777 | A | | 12/1999 | Yiu | | |
| 7,116,712 | B2 | * | 10/2006 | Vogelaar et al. | ........ | 375/240.03 |
| 2001/0036199 | A1 | * | 11/2001 | Terry | ........................... | 370/487 |
| 2003/0143985 | A1 | | 7/2003 | Yokoyama | | |
| 2004/0031056 | A1 | * | 2/2004 | Wolff | ........................ | 725/110 |

(Continued)

FOREIGN PATENT DOCUMENTS

WO WO 97/26762 7/1997

OTHER PUBLICATIONS

Cypress CY7C68013, Cypress Semiconductor Corporation, Jun. 21, 2002.*

*Primary Examiner*—Khanh Dang
(74) *Attorney, Agent, or Firm*—Intellectual Property Law Group LLP; Juneko Jackson; Otto O. Lee

(57) ABSTRACT

An interface (4) between a digital device (6) for transmitting and/or receiving a digital stream and a computer (2) comprises a digital stream transmitter/receiver (transceiver) (20), a computer bus interface (12) and a data converter (14, 16 & 18). The digital transceiver transmits digitally streamed content and/or receives digitally streamed content to/from the digital device. The computer bus interface receives/provides data to/from a computer bus of a computer for use by the computer and/or as provided by the computer. The data converter converts data received by the digital stream receiver into data useable by the computer from the computer bus and/or converts data received by the computer bus interface into digitally streamed data for transmission by the digital stream transmitter.

39 Claims, 8 Drawing Sheets

U.S. PATENT DOCUMENTS

2004/0255327 A1* 12/2004 Scheelke .................... 725/86
2005/0060759 A1* 3/2005 Rowe et al. ................ 725/143
2007/0011604 A1* 1/2007 Chiu ......................... 715/513

* cited by examiner

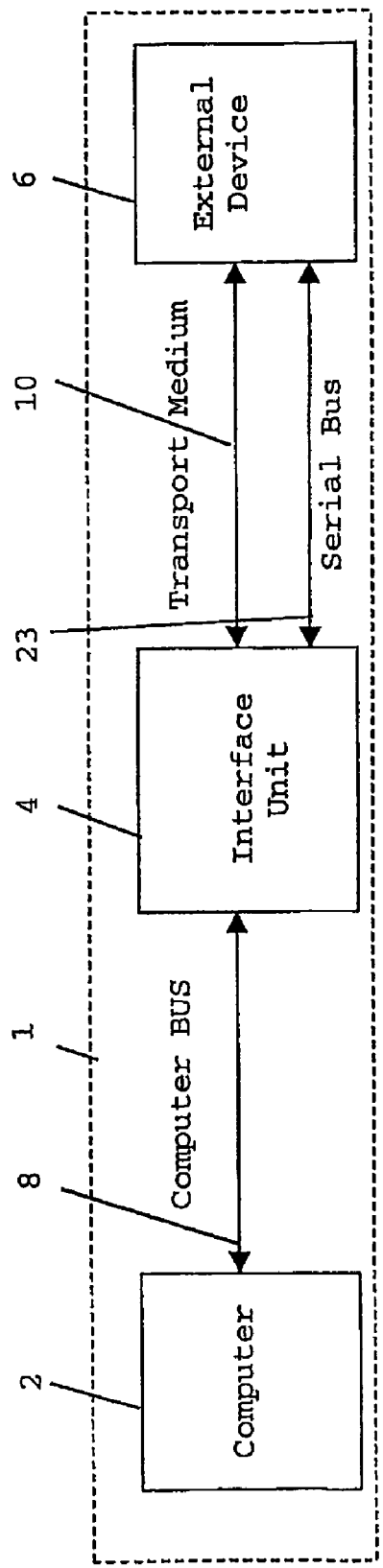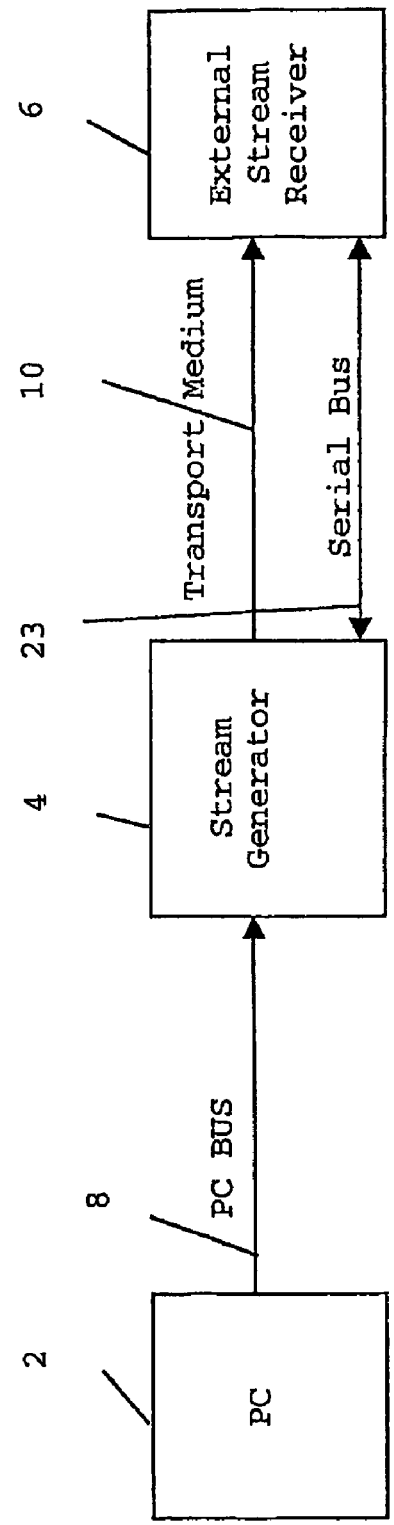

INTERFACE DEVICE

CROSS-REFERENCE TO RELATED APPLICATIONS

This application is the U.S. National Phase of International Patent Application No. PCT/SG2005/000011, filed Jan. 18, 2005 and published in English on Jul. 28, 2005, which claims the benefit of Singapore Patent Application No. 200400208, filed Jan. 19, 2004.

FIELD OF THE INVENTION

The present invention relates to an interface device for interfacing a digital stream transmission source or receiver to a computer.

BACKGROUND OF THE INVENTION

Devices such as set top boxes, modulators, etc, have ports to accept various types of digital streams. Examples of digital streams are MPEG2 transport stream, MPEG4 transport stream, MPEG7 transport stream, digital television transport stream, and high definition television transport stream. To process the digital stream the device coupled to the transport medium must comply with required, electrical characteristics and the transport stream protocol. Currently an individual module for each type of input stream must be specifically constructed and configured to meet the electrical and protocol characteristics for the type of digital stream being received.

The present invention provides an interface unit that can be configured to receive or transmit a plurality of types of digital bit stream. An optional object of the invention is to receive and/or transmit a digital bit stream according to the electrical characteristics of a digital stream receiver/transmitter and the bit stream protocols of a plurality of digital stream types.

BRIEF SUMMARY OF INVENTION

According to one aspect of the invention there is provided an interface between a digital device for transmitting and/or receiving a digital stream and a computer, the interface comprising:
  a digital stream transmitter/receiver (transceiver) for transmitting digitally streamed content and/or receiving digitally streamed content to/from the digital device;
  a computer bus interface for receiving/providing data to/from a computer bus of a computer for use by the computer and/or as provided by the computer; and
  a data converter for converting data received by the digital stream receiver into data useable by the computer when provided to the computer bus and/or for converting data received by the computer bus interface into digitally streamed data for transmission by the digital stream transmitter.

Preferably the digital stream transceiver is configured to meet electrical characteristics of the digital device. Preferably the data converter is configured to meet data transmission protocols of the digital device. Preferably the computer bus interface is configured to meet electrical characteristics of the computer bus and to meet data transmission protocol of the computer bus.

Preferably the data converter is configured to convert data into a selected digital stream format, the selected format being signalled to the data converter in data provided by the computer via the computer bus.

Preferably the data converter is also configured to convert the digital stream from a selected format into data usable by the computer when provided to the computer bus, the selected format being signalled to the data converter in the data provided by the computer via the computer bus.

Alternatively the data converter is configured to recognise the format of the digital stream and signal the recognised format to the computer in data provided to the computer bus.

Preferably the computer bus is a Universal Serial Bus (USB). Alternatively the computer bus is a Peripheral Component Interconnect (PCI) bus.

Preferably the data converter is a microcontroller. Preferably the microcontroller includes a general programmable interface. The general programmable interface is configured to be programmed to enable the data converter to meet the data transmission protocols of the digital device.

Preferably the digital stream type is one of an ATSC compliant transport stream, DVB compliant transport stream MPEG 2, MPEG 4, MPEG 7, digital satellite TV, TV tuner data, DVB/T, AC3, MP3, Dolby stereo, IEEE1394, IEE488 or digital radio format. The digital stream may include encoded video or sound information.

Preferably the data converter generates one or more control signals for control of the digital stream delivery to the digital device. Preferably the control signals are generated according to protocol requirements of the transport stream type (e.g. DVB Transport Stream requires a clock, packet sync. and data valid control signals).

Preferably the transceiver generates a digital clock signal and/or digital control signals. In one embodiment the transceiver includes an MPEG2 Transport Streamer I/O port.

Preferably the transceiver transmission rate may be controlled by a signal provided by the computer via the computer bus. Preferably the data is provided by the computer bus to the computer bus interface in bursts, which are buffered by the transceiver and transmitted to the transmission medium in a digital stream at the transmission rate. Preferably the transceiver buffers the digital stream sent by the digital device. Preferably the buffer is a FIFO buffer.

Preferably the digital stream transmitter is configured to generate two or more independent media streams. Preferably each media stream is produced from a multiplexed data stream, the multiplexed data stream is provided to a respective buffer and de-multiplexed by a dual or multi phase clock signal.

Preferably the digital stream transceiver converts voltage levels from those used by the data converter to those required by the digital device and vice versa.

Preferably the data converter is controlled by data provided by a computer program executed on the computer.

Preferably the computer program provides data to the data converter via the computer bus and in turn via the computer bus interface.

Preferably the computer program includes a module for providing a Graphical User Interface (GUI) for interaction with a user of the computer.

Preferably the computer program includes a system driver for providing control of the operation of the data converter and/or transceiver and/or digital device.

Preferably the computer program includes a library for displaying of video, audio playing or data transfers to specific applications according to data stream standards.

Preferably the GUI provides control of the display of video or playing of sound coded in the digital stream received by the digital stream receiver.

Preferably the data converter includes a serial bus input/output port that is configured to generate serial bus signals for activation and/or control of the digital device. Preferably the serial bus signals are generated by software running on the microcontroller or hardware/firmware of the interface. Preferably the serial bus signals are generated according to instructions provided by the computer in data sent to the microcontroller and stored in the interface. Preferably the serial bus signals are generated to be compliant with a suitable standard, e.g. IIC, RS-232 etc.

According to another aspect of the invention there is provided a computer to digital device interface comprising:
  a computer bus interface for receiving data from a computer bus of a computer as provided by the computer;
  a digital stream transmitter for transmitting digitally streamed content to the digital device; and
  a data converter for converting data received by the computer bus interface into digitally streamed data for transmission by the digital stream transmitter.

Preferably the interface further comprises an input/output (I/O) port. Preferably the I/O port is configured to de-multiplex the streamed data to two or more digital streams.

According to yet another aspect of the invention there is provided a digital device to computer interface comprising:
  a digital stream receiver for receiving digitally streamed content from the digital device;
  a computer bus interface for providing data to a computer bus of a computer for use by the computer; and
  a data converter for converting data received by the digital stream receiver into data useable by the computer when provided to the computer bus.

According to another aspect of the present invention a digital stream transmission medium to computer interface comprising:
  a digital stream transmitter/receiver for transmitting digitally streamed content and/or receiving digitally streamed content to/from the transmission medium;
  a computer bus interface for receiving/providing data to/from a computer bus of a computer for use by the computer and/or as provided by the computer; and
  a data converter for converting data received by the digital stream receiver into data useable by the computer when provided to the computer bus and/or for converting data received by the computer bus interface into digitally streamed data for transmission by the digital stream transmitter.

BRIEF DESCRIPTION OF DIAGRAMS

FIG. 1 is a schematic representation of a preferred form of a system including a preferred embodiment of an interface according to the present invention;

FIG. 2 is a schematic representation of a preferred form of the interface of FIG. 1, configured to operate as a stream generator;

DETAILED DESCRIPTION OF PREFERRED EMBODIMENTS

Figure 3:
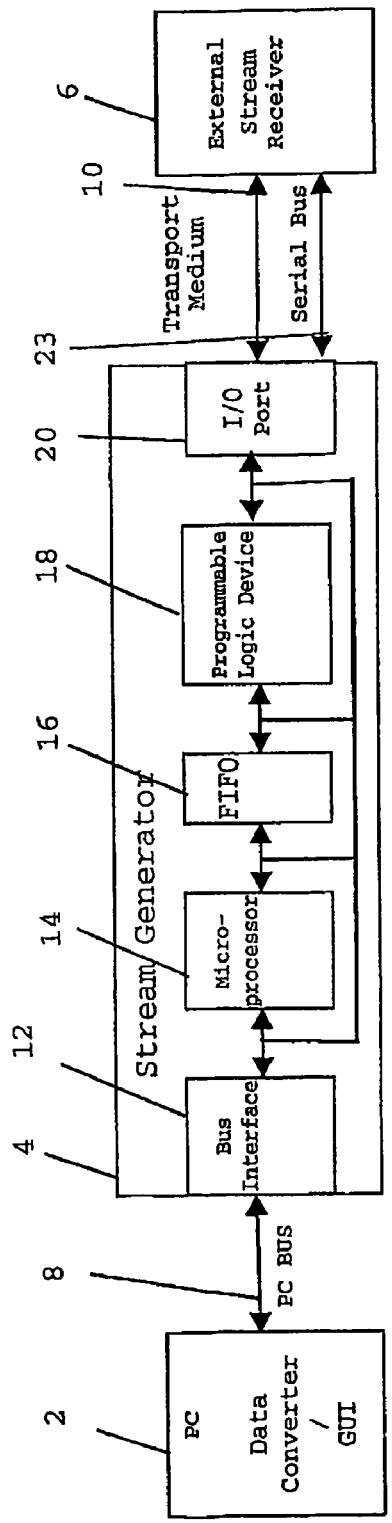
FIG. 3 is a schematic representation of a preferred form of implementation of the stream generator of FIG. 2.

Referring to FIG. 1, there is shown a system 1 including a computer 2, an interface unit 4, and an external device 6. The external device 6 is a digital stream transmitter/receiver. The computer 2 is preferably a personal computer (PC). The PC 2 is configured to generate digital content in a suitable format to transmit to the external device 6 via the interface unit 4 or to receive digital content transmitted from the external device 6 via the interface unit 4. The interface unit 4 communicates with the computer 2 by computer bus 8. The interface unit 4 also provides/receives the digital content as a digital stream to/from the external device 6 via digital stream transport medium 10. The transport medium 10 may be for example multi-cord cable, ribbon cable, (with suitable interface) wireless, etc.

A control signal cable 23 may optionally extend between the interface unit 4 and the external device 6 to provide function related control of the external device 6. This will be described further below.

The characteristics of the signal sent over the transport medium 10 nominally comprise a digital signal consisting of 8 or 16-bits of data, clock and control signals at TTL or LVDS compatible voltage levels. Alternatively data/control packets may be carried by radio frequency compatible with, Bluetooth, Wi-Fi (IEEE 802.11b/a/g) or immerging UWB wireless standard or other standard protocols.

Referring to FIG. 2, in this system the interface unit 4 operates as a stream generator (streamer), and the external device 6 operates as a receiver. The PC 2 is configured to transmit digital content and control signals in a suitable format (for example, format 32 in FIG. 12) to the stream generator 4 via the computer bus 8. The stream generator 4, sends the digital stream and control signals in the appropriate format (for example, format 33 in FIG. 12) to the receiver 6 via transport medium 10.

Referring to FIG. 3, the stream generator 4 includes a bus interface 12, a microprocessor 14, a First In First Out (FIFO) buffer 16, a Programmable Logic Device (PLD) 18, and an Input/Output (I/O) port 20. The bus interface 12 interacts with the PC bus 8 to send and receive control and data signals according to the protocol of the PC bus 8. The microprocessor 14 is configured to control the bus interface 12, configure the FIFO buffer 16, program the PLD 18, and coordinate the data transfer from the bus interface 12 to FIFO buffer 16. Data is normally sent from the PC bus 8 in burst mode. The FIFO buffer 16 controls the flow of data transferred over the transport medium 10 by storing data sent over the computer bus 8 and by releasing this data to the I/O port 20 when requested by the PLD 18. The PLD 18 implements the digital stream protocol required by the external device 6. It may also interact with the external device 6 by control signals sent over the cable 23. The I/O Port 20 converts the TTL signal from the PLD 18 into an electrical form that is compatible with the transport medium 10 and external device 6.

The PLD 18 is programmed operate according to instructions stored on non-volatile memory by the microprocessor 14. The microprocessor 14 may be configured to change the instructions upon direction by the PC 2. This is useful when the PLD 18 is programmed to provide digitally streamed data in one format and it is desired to send it in another format. The PLD 18 may be reprogrammed to provide the streamed data in the new format or according to a different standard.

Figure 4:
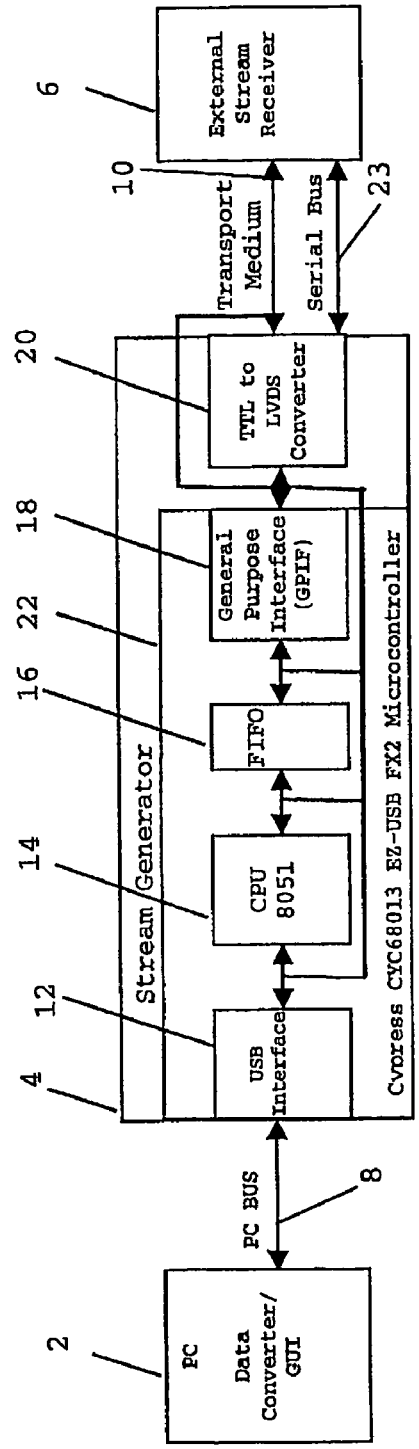
FIG. 4 is a schematic representation of a preferred embodiment of the system including a more preferred embodiment of the interface of present invention for providing digital television content data to an external digital stream receiving device.

Referring to FIG. 4, in this embodiment the stream generator is configured to generate a MPEG2 Transport Stream (TS). The PC bus 8 is a Universal Serial Bus (USB) bus. A Cypress CY7C68013 microcontroller is used to perform the role of bus interface 12, microprocessor 14, FIFO buffer 16 and PLD 18. Here the bus interface 12 is a serial interface engine for USB. The microprocessor 14 is a Cypress enhanced Intel 8051 CPU. The FIFO buffer 16 is a pure slave FIFO buffer. The PLD 18 is in the form of a state machine, called a General Purpose Interface (GPIF) by Cypress. It acts as a master of the FIFO buffer 16. The CY7C68013 GPIF offees a maximum of 6 control outputs, 6 control inputs and 9 address lines. It has up to seven programmable states. The operation of the GPIF 18 is controlled by programming stored on the non-volatile memory.

To generate a MPEG2 Transport Stream in DVB Standard Parallel format, two data flow control signals are required in addition to the actual streamed data. A Packet Sync signal is asserted at the beginning of every TS packet. A Data Valid signal is asserted when the output contains useful TS data. These two signals are generated by a computer program which runs on the PC 2. The computer program is one of the software modules 25 in FIG. 11 and is described further below.

The I/O port 20 comprises a TTL to LVDS voltage converter. The output format conforms to a DVB Standard Parallel Interface, which consists of 8 data lines, two data flow control signal lines (which carry the Packet Sync. and Data Valid signals), and a clock signal line. The GPIF is programmed to generate the clock signal and the control signals from the data received from the PC 2. The Packet Sync. signal is asserted at the first byte of every Transport Stream (TS) packet, and the Data Valid signal is used to indicate when the output contains useful data.

These two control signals are treated as normal data in the data sent to the stream generator 4 by the PC 2. One bit representing Packet Sync will be set to one on the first byte of every TS packet, and another bit representing Data Valid will be set to one for every useful data.

Figure 12:
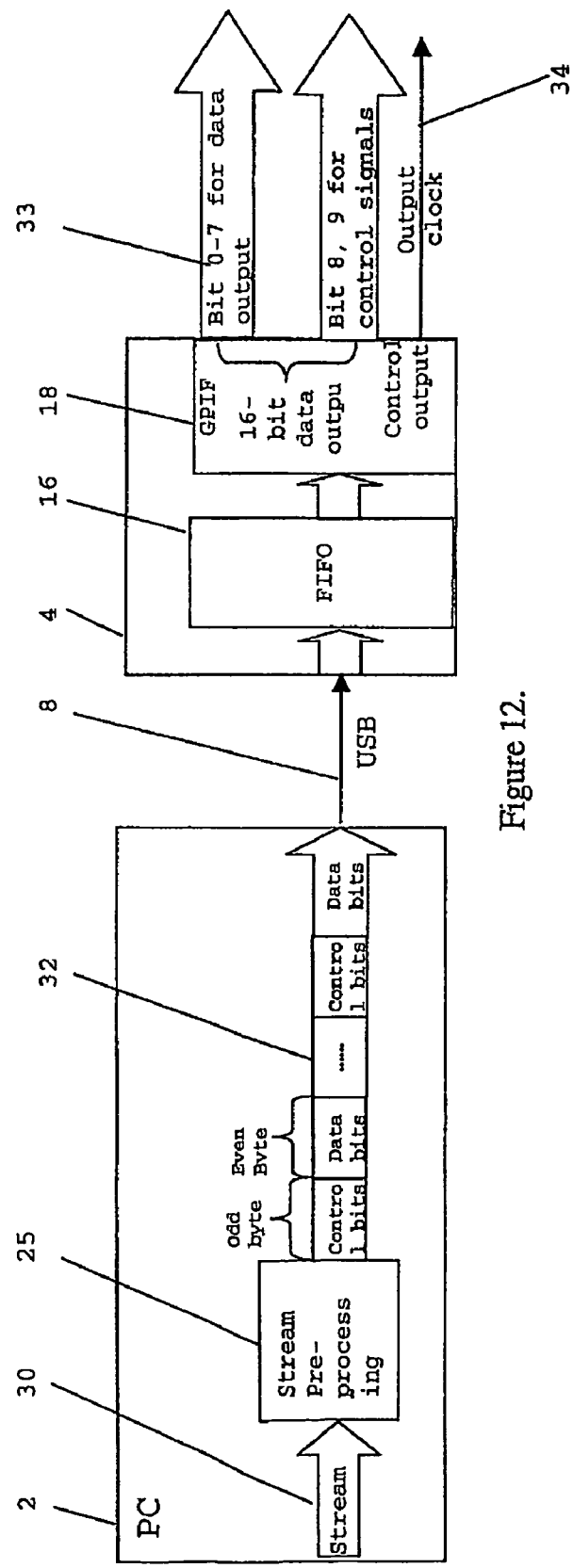
FIG. 12 is a system model representing the stream flow associated with the data and control signal generation of the transceiver.

Referring to FIG. 12, the computer program 25 executing on PC 2 is used to preprocess the stream data 30 and generates the two control signals to be sent along with the TS packet data 30 to the stream generator 4 in a 16 bit format. The even bytes are used for TS packet data and the odd bytes are used for the control signals. These will be reflected in the signals 32 sent on the computer bus 8 to the steam generator 4.

The GPIF 18 is configured as a 16-bit output port which divides the 16 bit data 33 into TS data (lines 0 to 7) and control signals (lines 8 & 9). The remaining bits (10 to 15) are unused.

In operation the bus interface 12 and the PLD 18 are initialized to operate in the required mode for streamer operation. This includes the USB functionality, GPIF control modes and GPIF port functionality to transport data, and generate data flow control signals and the clock signal.

Figure 10:
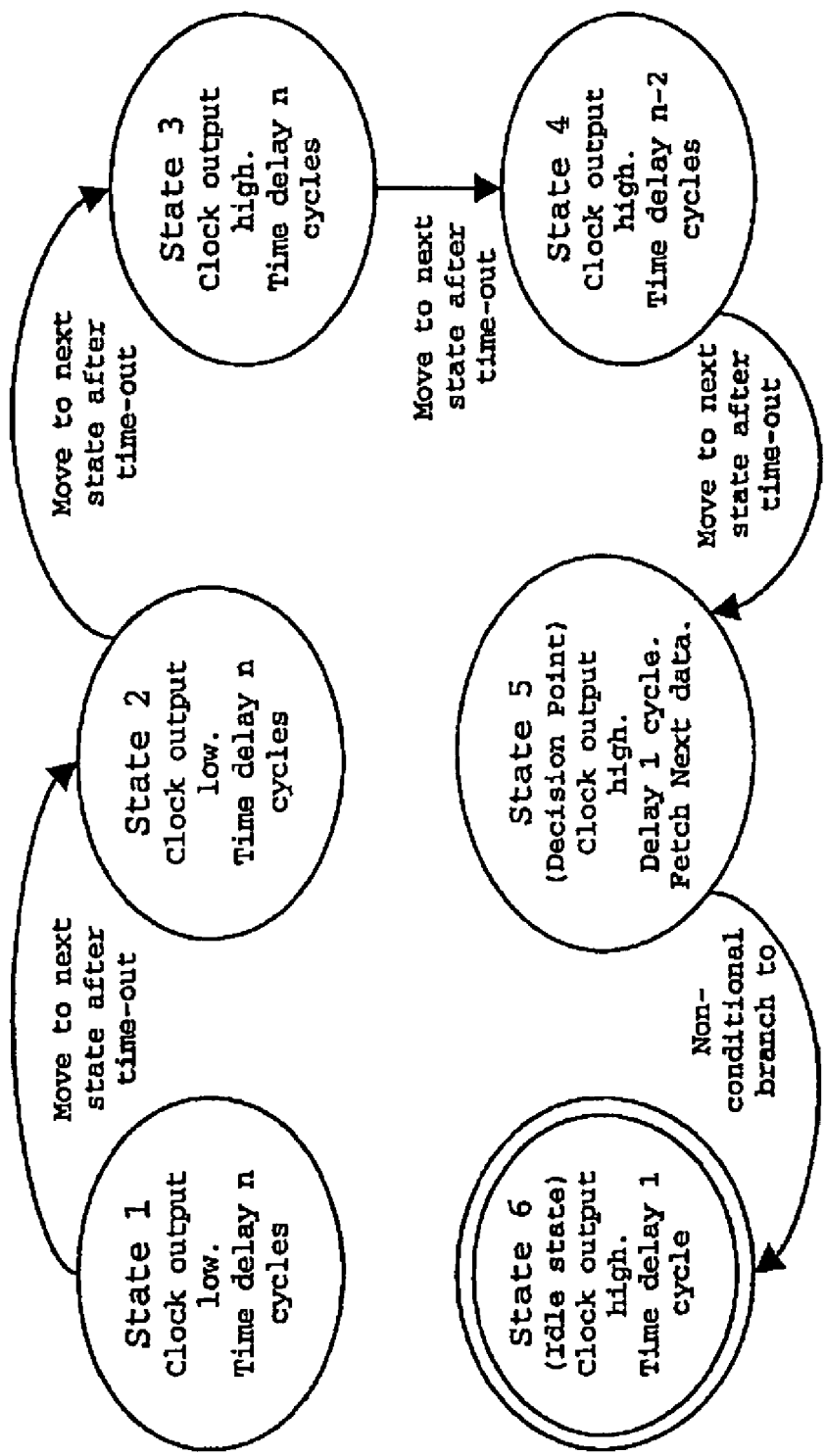
FIG. 10 is a state diagram of a state machine of one embodiment of the interface of FIG. 1.

Referring to FIG. 10, the GPIF functions as a state machine having three types of states, namely: non-decision point, decision point and idle state. The GPIF allows a maximum of 6 non-idle states to be defined.

The GPIF 18 contains several programmable control output pins. Each state determines the logic level of these output pins, the time delay, and also decides on whether to drive the data or whether to advance the FIFO buffer 16 pointer to fetch the next data. These operations are specified in each state definition data.

The GPIF 18 is programmed according to the following steps. The time delay for each GPIF state is determined based on the transport stream data rate. The GPIF 18 receives an input clock signal of 48 MHz from a clock signal generator (not shown). Thus, the inherent accuracy is one input clock period (20.8 ns).

For the implementation of the streamer, at least two non-decision point states are used. One of the GPIF control output pins is used as the output clock for the data stream.

Four of the states are used to control the clock output. A GPIF transaction is regarded as reading or writing one byte (or one word if the GPIF is configured with a 16-bit port). A transaction starts in State 1. The first half of the four clock output control states (States 1 and 2) will set the clock output pin to be logic low. The other half of the four clock output control states (States 3 and 4) set the clock output to logic high. The state machine will remain in State 1 for n input clock cycles, where n is a quarter of the number of 20.8 ns cycles required for one output clock cycle. The state machine will then move to State 2, where it will remain for another n input clock cycles. The state machine will then move to State 3, where the clock output pin is set to logical one. The state machine remains in this state for a further n input clock cycles and then moves to State 4, where it remains for n−2 input clock cycles and then moves to State 5. In State 5 the next data is fetched from the FIFO buffer 16 by advancing the buffer pointer.

This state lasts for one input clock cycle and is a decision point, which is programmed to unconditionally branch to the next state, State 6. State 6 is a one input clock cycle idle state to end one transaction. After entering the idle state, State 6, the transaction will start all over again if there is data available.

The GPIF will monitor the FIFO buffer 16 empty flag. If there is no data, the transfer will be halted. This is achieved by the microcontroller implementing a transaction counter. The transaction count is initialised to a high number and configured to count down by one for each completed transaction. If the counter reaches zero the state machine remains in the idle state. As more data is received from the PC 2 the transaction counter is re-initialised to the high number and the transfer is resumed.

Figure 11:
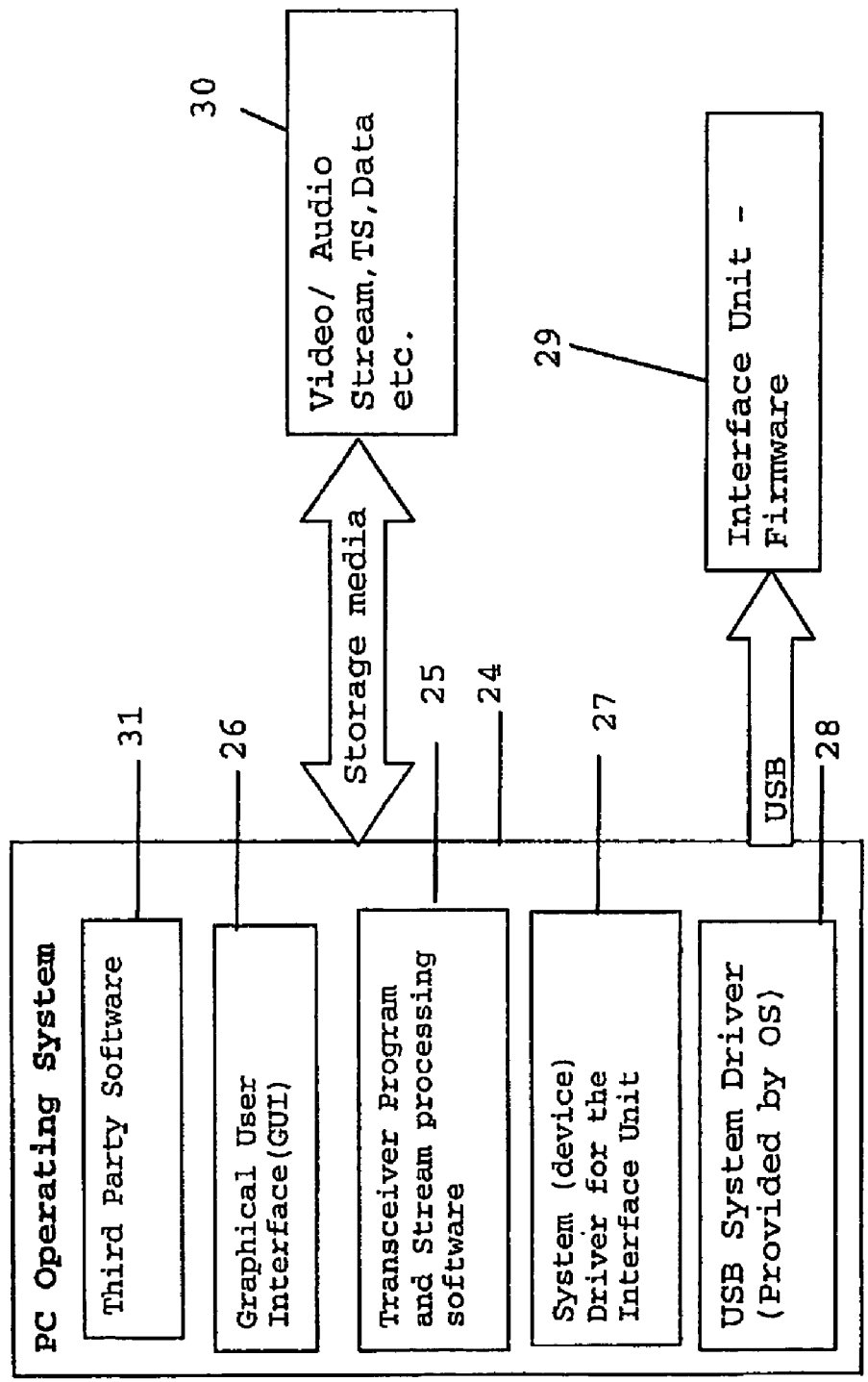
FIG. 11 is a software model for execution on a computer for controlling the computer to use the interface of FIG. 1.

Referring to FIG. 11, on the PC side, a device driver 27 is used to move data between the computer program 25 and the stream generator 4 through the USB 8. The driver does not need to have any knowledge of the stream format. It just treats any data as a byte stream. Another driver 28 is responsible for handling the PC bus communication protocol, which in this case is USB.

Figure 5:
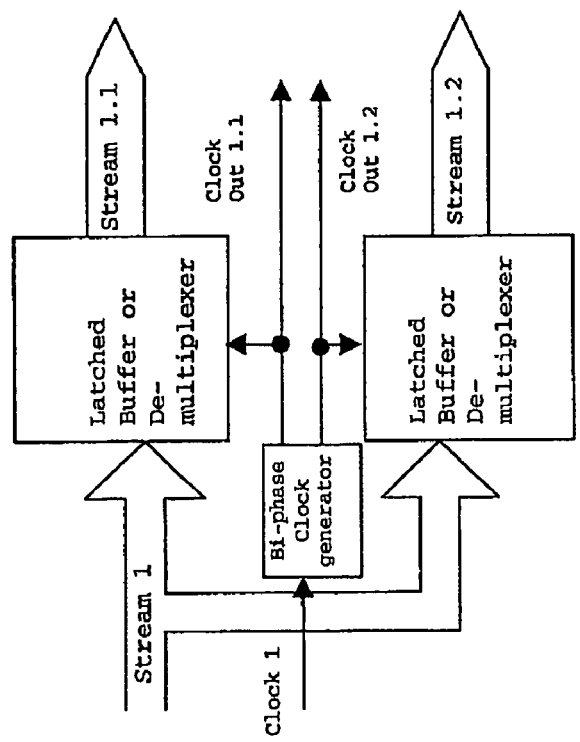
FIG. 5 (a) is a schematic representation of another preferred form of the output of the interface according to the present invention, which is configured as a dual stream generator.
Figure 5A:
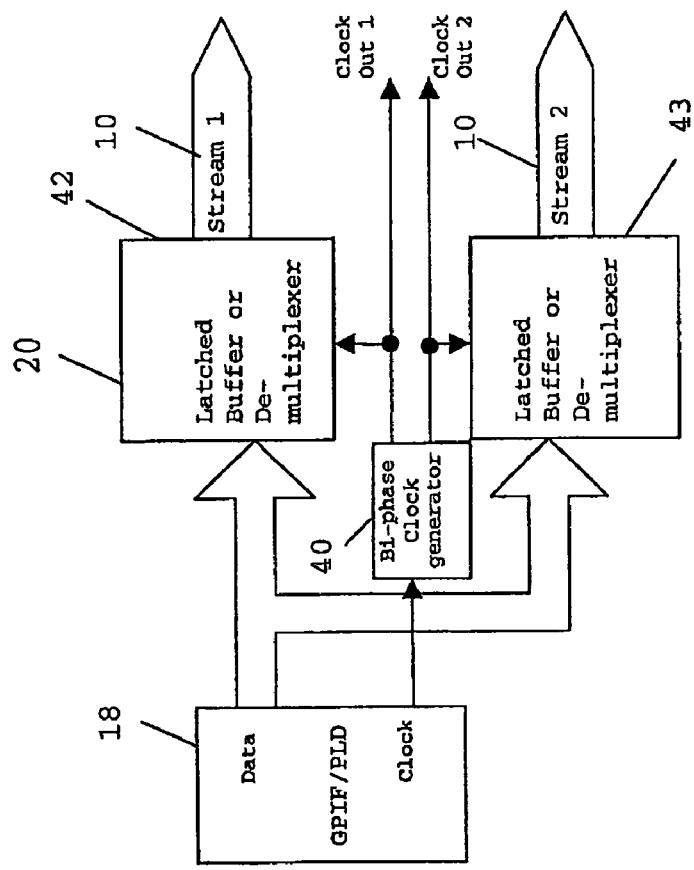
FIG. 5(b) is a schematic representation of the output of the interface of FIG. 5(a) with additional components to further split the stream into multiple streams.

Referring to FIG. 5(a), in this embodiment the output port operates as a dual output port, which includes a bi-phase clock generator 40 and two latch buffers 42 and 43 or instead of the buffers, a de-multiplexer. The rest of the system is similar to that in FIG. 4. The stream output from the GPIF 18, consists of two data streams, which are multiplexed in byte intervals. The output clock runs at twice the speed of the stream clock. The output clock is used by the Bi-phase Clock Generator 40 to generate a Bi-phase Clock signal. The Bi-phase signal is used to select one of two output buffers 42 or 43 or to select the data to be separated by the de-multiplexer. Each output stream (from the buffers 42 & 43, or the de-multiplexer) is transmitted to separate transport mediums 10.

Using the same method, it is possible to add virtually any numbers of outputs. For example, to add one additional output, two streams are multiplexed into one using the same method described above, and a third stream is then multiplexed with the previous resulting stream. The design of a further de-multiplexing output port is shown in FIG. 5(b).

The two output streams must have the same streaming rate. However, if one of the streams is slower than the other it is possible to stuff dummy packets in the slower stream to maintain the stream rate. The multiplexing process is then straight forward. For example, the first byte of the multiplexed stream will contain the first byte of stream one, the second byte of the multiplexed stream will contain the control byte of stream one, the third byte will contain the first byte of stream two, the forth byte will contain the control byte of stream two, the fifth byte will be the second byte of stream one, and so forth.

Figure 6:
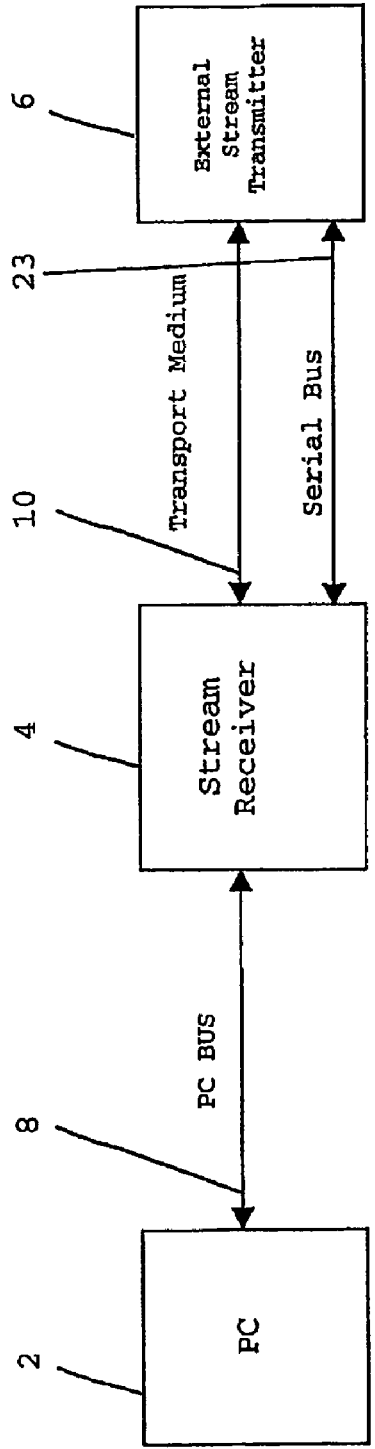
FIG. 6 is a schematic representation of another preferred form of an interface of FIG. 1, configured to receive a digital stream and provide it to a computer.

Referring to FIG. 6, in this system, the interface unit 4 operates as a stream receiver, and the external device 6 operates as a transmitter. The interface 4 receives the digital stream via one or more transport mediums 10 and provides it to the PC 2. Cable 23 carries additional control signals to the external device 6. These control signals relate to the control of the operation of the external device and not the control of the data flow.

Figure 7:
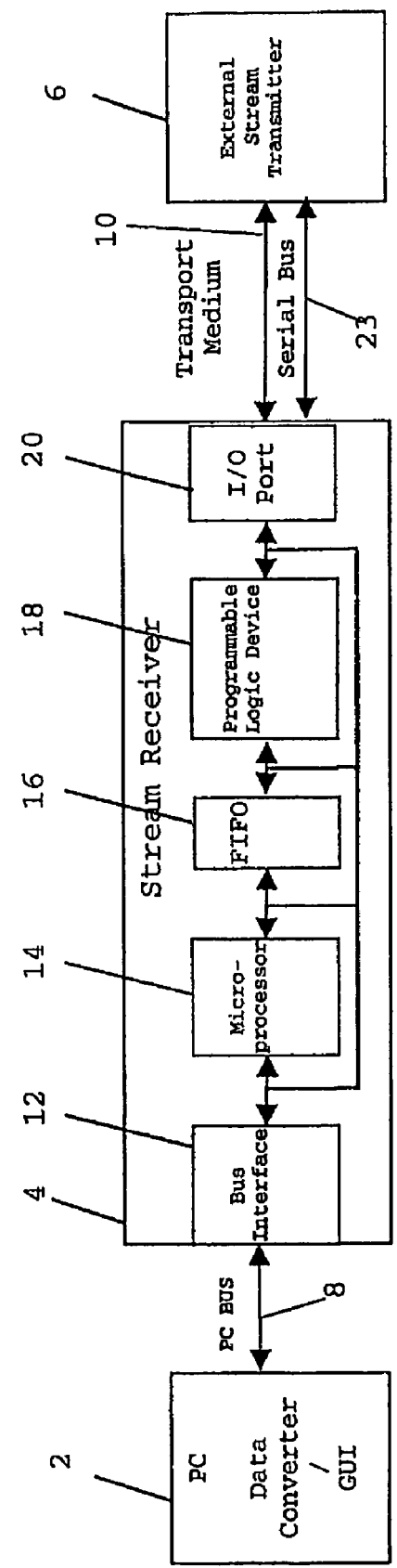
FIG. 7 is a schematic representation of a preferred form of the interface of FIG. 6 configured to operate as a stream receiver.

Referring to FIG. 7, the stream receiver 4 includes a bus interface 12, a microprocessor 14, a FIFO buffer 16, a Programmable Logic Device (PLD) 18, and an I/O port 20. The roles of these modules are similar to those in the stream generator of FIG. 3, except that the data transfer direction is now from the external device 6 to the PC 2.

Figure 8:
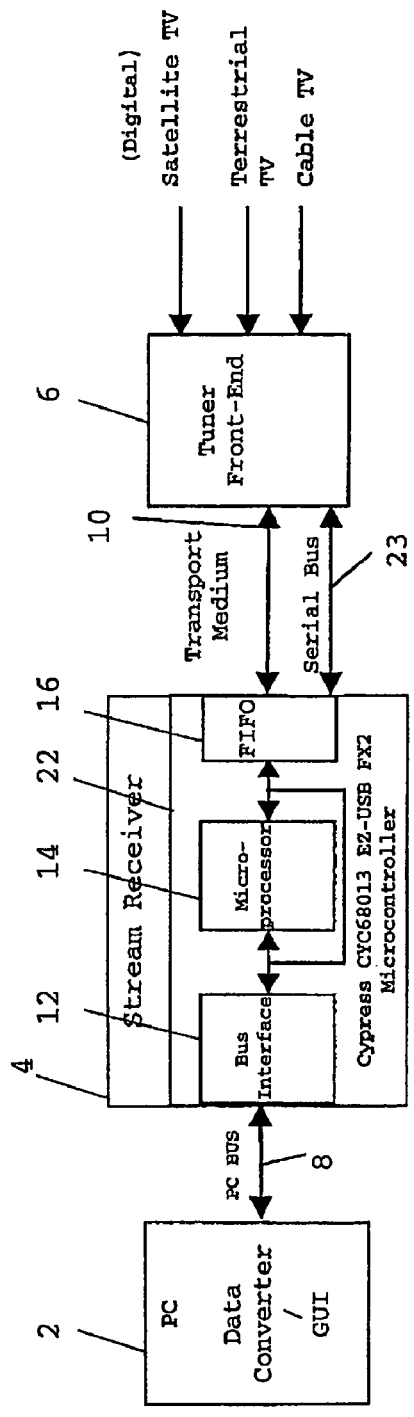
FIG. 8 is a schematic representation of a preferred embodiment of the system including a more preferred embodiment of the interface of the present invention for receiving digital television from an external digital TV stream transmission device and providing it to a computer.

Referring to FIG. 8, in this embodiment the stream receiver is configured to receive a MPEG2 Transport Stream. The PC bus 8 is a USB bus. A Cypress CY7C68013 microcontroller is used to act as the bus interface 12, microprocessor 14, and FIFO 16. Here the bus interface 12 is a Serial Interface Engine (SIE) for USB. The microprocessor 14 is a Cypress enhanced Intel 8051 CPU. The cable 23 operates as a serial bus, namely as an IIC bus.

The microprocessor 14 and the SIE 12 handle the USB communication with the PC 2. The FIFO buffer 16 is a pure slave FIFO buffer. The external stream transmitter 6 is a digital TV tuner. The tuner 6 may be receiving, for example, Digital Satellite TV, Digital Terrestrial TV or Digital Cable TV. The digital stream format conforms to DVB Standard Parallel Interface, which contains parallel data synchronized to a tuner generated clock signal. Because the output signal of the tuner is in TTL form it can be connected directly to the input pins of the microcontroller. Thus the I/O port 20 (not shown in this figure) merely passes the signals therethrough or is bypassed entirely. The data is transferred directly to the FIFO buffer 16 using timing signals provided by the tuner clock signal. If the stream produced by the tuner 6 is a MPEG2 TS, the Packet Sync. and Data Valid control inputs are not used. Therefore, the PLD 18 is also omitted or not used/by-passed.

In operation the microprocessor 14 will first initialize the bus interface 12 and FIFO buffer 16. It also configures the I/O port 20 and PLD 18 to be inactive/by-passed. The Packet Sync. and Data Valid control signals are simply discarded. The stream data will be put into the FIFO buffer 16 first and will be transferred to the PC 2 via USB 8 when the PC 2 sends a request for data. To achieve a high bit rate, the FIFO buffer 16 is configured to bypass the microprocessor and directly interface with SIE 12.

On the PC side, the same device drivers are used for Stream Receiver as the ones for the Stream Generator to handle USB communication protocol and interface control.

Figure 9:
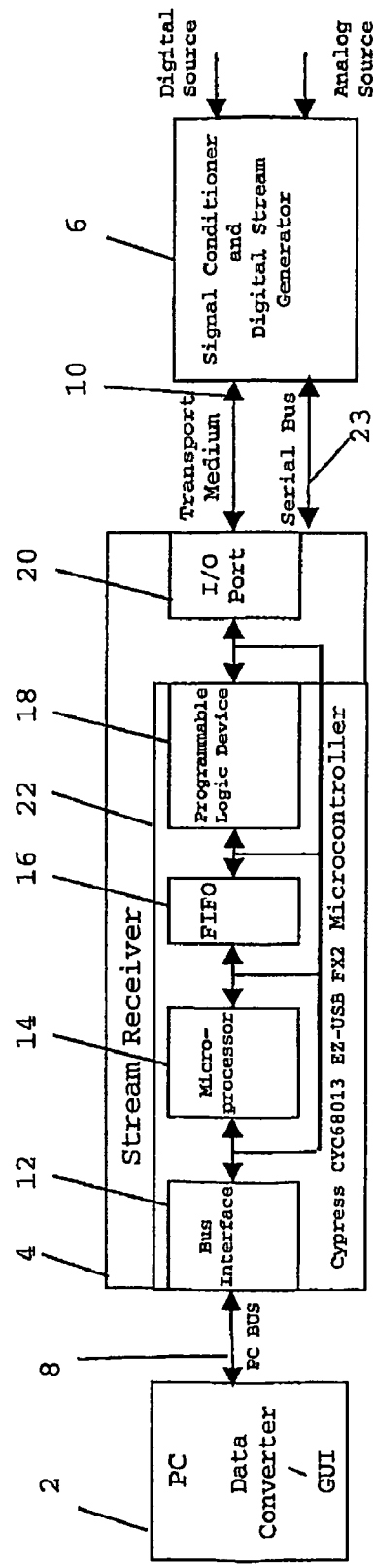
FIG. 9 is a schematic representation of another preferred embodiment of the system including a more preferred embodiment of the interface of the present invention for receiving digital signal from a source and providing it to a computer.

In FIG. 9 the digital stream source 6 is a Signal Conditioner and Digital Stream Generator (SC & DSG). The SC & DSG modulates/encodes signals from either an analogue source or a digital source and applies the resulting digital stream to the transport medium 10. The digital stream is received by the interface unit 4 from the transmission medium 10. Using the input stream, containing data and associated clock signal (provided by the external device), the stream receiver 4 processes the data in similar manner to the description above for FIG. 8. The GPIF 18 is programmed to implement the stream protocol to handle external handshaking signals to synchronize the communication with the external device 4. The I/O port 20 is used to convert the output electrical signal levels of the external digital source 6 to the logic level required by the PLD 18. The Serial Bus 23 can be any serial bus standard (e.g. IIC). Again is provides operational control signals to the external device 6.

Referring to FIG. 11, the PC2 operates under an operating system 24. Several software modules 25, 26 and 27 are used by the PC 2 operating system 24 to process the MPEG2 Transport Stream (TS), display videos, and/or play audios. Suitable operating systems include Microsoft's Windows 2000 or Windows XP as well as various forms of Linux. In particular one of the modules 25 operates are the computer program for generating data flow control signals that accompany the content data over the transport medium to the digital device 4.

The operating system 24 will include a computer bus driver 28, for example a USB driver, PCI driver, IEEE 1394 etc., the appropriated one of which is used depending the computer bus 8 used.

A Graphical User Interface (GUI) 26 is included in the operating system 24 or is supplied with the software modules 25 and 27 to provide a convenient method of interaction of a user with the software modules 25 to control the operation of the interface unit 4 and to control the PC 2 to provide the digital content to the external device 6 via interface unit 4 or use the digital content provided by the external device 6 via interface unit 4.

An MPEG2 Transport Stream (TS) consists of a stream of packets 30. The TS packet has a constant size of 188 bytes. Each packet has a packet identifier (PID). There are several different types of packets, e.g. Program Specific Information (PSI) packet, Elementary Stream Packet, Network Information Packet, etc. A Transport Stream will normally consist of multiple TV programs. PSI packets are used to describe the contents the stream. PSI is actually a two level table. PID 0 is reserved for one type of PSI packet called Program Association Table (PAT). This table gives the PIDs of yet another PSI packet called Program Map Table (PMT). Each PMT corresponds to one program. It contains the PIDs for the video, audio and/or other data stream packets. Based on these tables, a computer program (one of the modules 25) can pick the right packets for display video and/or playing audio.

One or more software modules 25 are used to handle various the protocols defined in Digital Television (DTV) Standards (DVB-T, DVB-C, DVB-S, ATSC, etc.) These software modules may be developed using the Microsoft DirectX Software Development Kit (SDK) 9.0. Specifically, Microsoft TV Technology in DirectShow (part of DirectX SDK) is used. The Microsoft DirectX SDK document is available from Microsoft Corporation. DirectShow provides modules, which can make the underlying DTV Standard transparent to the user.

One of the software modules 25 is used to control the tuner device via the device driver 27. The software module is implemented as a DirectShow compatible Filter. The device driver 27 forwards the tuner related commands to the microcontroller through the USB. The microcontroller uses the serial bus 23 to communicate with the turner device or other digital device 6. The tuner device 6 accepts control data via serial bus 23. A firmware program 29 running on microcontroller will pass the commands to tuner device via the serial bus port 23.

One of the software modules 25 is used to capture the data stream received by the device driver 27. The core of this module is implemented in plain C++ with a wrap filter used to make it DirectShow compatible.

Another of the software modules 25 is used to extract PSI packets from the Transport Stream. A suitable software module is Microsoft's BDA Network Information Filter.

Yet another of the software modules 25 is used to select one or more programs (audio, visual, or data stream) out of the Transport Stream. The core of this module may be implemented in plain C++ with a wrap filter used written to make it DirectShow compatible.

One (or more) software module(s) 25 is (are) used to decode the stream (audio, visual, or data stream) for rendering. The video decoder can be any DirectShow compatible MPEG2 decoder. A suitable Decoder is a DirectShow compatible filter based on an open source project libmpeg2.

One of the software modules 25 enables picture in picture facilities on the PC 2 to display multiple videos (in small windows) while tuned to a channel. A suitable module is Microsoft's Video Mixing Renderer filter. The software module allows the selection of one program by clicking a picture in the window. This is achieved by reconfiguring the renderer filter.

Other software 31 may be installed on the PC 2 to interact with the GUI 26, the digital data 30 or interface unit via driver 27.

A person skilled in the art will realise that the use of a software programmable logic device (PLD) in the present invention allows the implementation of a plurality of communication protocols and device handshaking which can be reprogrammed to implement various communication protocols or handshaking between the interface unit 4 and the external device 6. This provides a generic way of transmitting/receiving data stream to/from a PC. Because it is software programmable, the user can change the communication protocol from the PC without there being any changes to the interface unit.

The skilled addressee will realise that modifications and variations may be made to the present invention without departing from the basic invention concept. Such a modification may be to implement a more complex handshaking interface (e.g. IDE), in this case other PLD or programmable logic device (CPLD) or Field Programmable Gate Arrays (FPGA), chips can be used to replace the GPIF. These chips are available from the following IC manufactures, Atmel's (AT40K and AT40KAL Series), Altera, Xilinx (Spartan-3 FPGAs Vertex II Family devices) or Lattice (ispXPGA Family of FPGAs).

Modifications and variations as would be obvious to the skilled address are intended to fall within the scope of the present invention, the nature of which should be determined from the foregoing description and appended claims.

The invention claimed is:

1. An interface for interfacing a digital device (unit) for transmitting and/or receiving a digital stream to a computer, the interface comprising:
    a digital stream transmitter/receiver for transmitting digitally streamed content and/or receiving digitally streamed content to/from the digital device;
    a computer bus interface for receiving/providing data to/from a computer bus of a computer for use by the computer and/or as provided by the computer, the computer bus interface operatively connected with the digital stream transmitter/receiver; and
    a data converter operatively connected to the computer bus interface and operatively connected to the digital stream transmitter/receiver, for converting data received by the digital stream receiver into data useable by the computer when provided to the computer bus and/or for converting data received by the computer bus interface into a plurality of types of digitally streamed data for transmission by the digital stream transmitter;
    wherein during transmitting or receiving of data, the data converter is reconfigurable by the computer to provide the plurality of types of digitally streamed data and one or more control signals according to a desired format and protocol for the digital device, without requiring a presence on the device of an individual module configured for handling each type of the plurality of types of digitally streamed data received by the digital device.

2. An interface according to claim 1, wherein the digital stream transmitter/receiver (transceiver) is configured to meet electrical characteristics of the digital stream device.

3. An interface according to claim 1, wherein the data converter is configured to meet data transmission protocols of the digital device.

4. An interface according to claim 1, wherein the computer bus interface is configured to meet electrical characteristics of the computer bus and to meet data transmission protocol of the computer bus.

5. An interface according to claim 1, wherein the data converter is configured to convert data into a selected digital stream format, the selected format being signalled to the data converter in data provided by the computer via the computer bus.

6. An interface according to claim 5, wherein the data converter is also configured to convert the digital stream from a selected format into data usable by the computer when provided to the computer bus, the selected format being signalled to data converter in the data provided by the computer via the computer bus.

7. An interface according to claim 5, wherein the data converter is configured to recognise the format of the digital stream and signal to the computer in data provided to the computer bus the recognised format.

8. An interface according to claim 1, wherein the computer bus is a Universal Serial Bus (USB).

9. An interface according to claim 1, wherein the data converter is a microcontroller.

10. An interface according to claim 9, wherein the microcontroller includes a general programmable interface.

11. An interface according to claim 1, wherein the data converter is a state-machine.

12. An interface according to claim 11, wherein the state-machine is a PLD or programmable logic arrays (PLA) or general programmable interface.

13. An interface according to claim 1, wherein the digital stream type is one of an ATSC compliant transport stream, DVB compliant transport stream, MPEG 2, MPEG 4, MPEG 7, digital satellite TV, TV tuner data, DVB/T, AC3, MP3, Dolby stereo, IEEE1394, IEE488 or digital radio format.

14. An interface according to claim 1, wherein the digital stream may include video or sound.

15. An interface according to claim 1, wherein the data converter generates one or more control signals for control of the digital stream delivery to the digital device.

16. An interface according to claim 15, wherein the control signals are generated according to protocol requirements of the transport stream type the transceiver generates a digital clock signal and/or digital control signals.

17. An interface according to claim 1, wherein the transceiver transmission rate may be controlled by a signal provided by the computer via the computer bus.

18. An interface according to claim 1, wherein the data is provided by the computer bus to the computer bus interface in bursts which are buffered by the transceiver and transmitted to the transmission medium in a digital stream at the transmission rate.

19. An interface according to claim 1, wherein the transceiver buffers the digital stream sent by the digital device.

20. An interface according to claim 18, wherein the interface includes a buffer for buffering the data passing therethrough.

21. An interface according to claim 1, wherein the digital stream transmitter is configured to generate two or more independent media streams.

22. An interface according to claim 21, wherein at the physical signal layer each digital stream is produced from a multiplexed data stream, the multiplexed data stream is provided to a respective buffer and de-multiplexed by a dual or multi phase clock signal.

23. An interface according to claim 1, wherein the transceiver converts voltage levels from those used by the data converter to those required by the digital device and vise versa.

24. An interface according to claim 1, wherein the transceiver converts voltage levels from those used by the digital device to those required by the data converter.

25. An interface according to claim 1, wherein the data converter may be controlled by data provided by a computer program.

26. An interface according to claim 25, wherein the computer program provides data to the data converter via the computer bus and in turn via the computer bus interface.

27. An interface according to claim 25, wherein the computer program includes a system driver for providing control of the operation of the data converter and/or transceiver and/or digital device.

28. An interface according to claim 1, wherein the computer program interfaces with the operating system (OS) of the computer.

29. An interface according to claim 25, wherein the computer program may control the display of video or playing of sound coded in the digital stream received by the digital stream receiver.

30. An interface according to claim 1, wherein the data converter includes a serial bus input/output port that is configured to generate serial bus signals for activation and/or control of the digital device.

31. An interface according to claim 30, wherein the serial bus signals are generated by software running on the microcontroller or hardware/firmware of the interface.

32. An interface according to claim 30, wherein the serial bus signals are generated according instructions provided by the computer in data sent to the microcontroller and stored in the interface.

33. An interface according to claim 30, wherein the serial bus signals are generated according instructions provided by the computer in data sent to the microcontroller and stored in the interface.

34. An interface according to claim 30, wherein the serial bus signals are generated to be compliant with a suitable standard.

35. A computer to digital device interface comprising:
a computer bus interface for receiving data from a computer bus of a computer as provided by the computer;
a digital stream transmitter for transmitting digitally streamed content to the digital device, the digital stream transmitter operatively connected to the computer bus interface; and
a data converter operatively connected to the computer bus interface and operatively connected to the digital stream transmitter, for converting data received by the computer bus interface into a plurality of types of digitally streamed data for transmission by the digital stream transmitter;
wherein during transmitting or receiving of data, the data converter is reconfigurable by the computer to provide the plurality of types of digitally streamed data and one or more control signals according to a desired format and protocol for the digital device, without requiring a presence on the device of an individual module configured for handling each type of the plurality of types of digitally streamed data received by the digital device.

36. An interface according to claim 35, wherein the interface further comprises an input/output (I/O) port.

37. An interface according to claim 36, wherein at the physical layer, the I/O port is configured to de-multiplex the streamed data to two or more digital streams.

38. A digital device to computer interface comprising:
a digital stream receiver for receiving digitally streamed content from the digital device;
a computer bus interface for providing data to a computer bus of a computer for use by the computer, the computer bus interface operatively connected with the digital stream receiver; and
a data converter operatively connected to the digital stream receiver and operatively connected to the computer bus interface, for converting data received by the digital stream receiver into data useable by the computer when provided to the computer bus;
wherein during providing or receiving of data, the data converter is reconfigurable by the computer to provide a plurality of types of digitally streamed data and one or more control signals according to a desired format and protocol for the digital device, without requiring a presence of an individual module configured for handling each type of the plurality of types of digitally streamed data received by the digital device.

39. A digital stream transmission medium to computer interface comprising:
- a digital stream transmitter/receiver for transmitting digitally streamed content and/or receiving digitally streamed content to/from the transmission medium;
- a computer bus interface for receiving/providing data to/from a computer bus of a computer for use by the computer and/or as provided by the computer, the computer bus interface operatively connected to the digital stream transmitter/receiver; and
- a data converter operatively connected to the digital stream transmitter/receiver and operatively connected to the computer bus interface, for converting data received by the digital stream receiver into data useable by the computer when provided to the computer bus and/or for converting data received by the computer bus interface into a plurality of types of digitally streamed data for transmission by the digital stream transmitter;
- wherein during transmitting or receiving of data, the data converter is reconfigurable by the computer to provide the plurality of types of digitally streamed data and one or more control signals according to a desired format and protocol for the digital device, without requiring a presence on the device of an individual module configured for handling each type of the plurality of types of digitally streamed data received by the digital device.

* * * * *